US008301668B1

(12) United States Patent
He et al.

(10) Patent No.: US 8,301,668 B1
(45) Date of Patent: Oct. 30, 2012

(54) EXPRESSION BUILDER

(75) Inventors: Wenbin He, Foster City, CA (US);
Wenfeng Li, Foster City, CA (US); Jun Zhai, San Mateo, CA (US); Petter Ivmark, San Francisco, CA (US); Gauri Tikekar, Sunnyvale, CA (US)

(73) Assignee: Actuate Corporation, San Mateo, CA (US)

( * ) Notice: Subject to any disclaimer, the term of this patent is extended or adjusted under 35 U.S.C. 154(b) by 599 days.

(21) Appl. No.: 12/105,936

(22) Filed: Apr. 18, 2008

Related U.S. Application Data

(60) Provisional application No. 60/937,578, filed on Jun. 27, 2007.

(51) Int. Cl.
*G06F 17/30* (2006.01)

(52) U.S. Cl. ........ 707/804; 707/755; 707/756; 707/791; 707/793; 707/802; 707/803; 707/705

(58) Field of Classification Search .................. 707/705, 707/600, 802, 763, 736, 755–756, 791, 793, 707/803, 804; 715/234, 709, 710; 717/117, 717/105
See application file for complete search history.

(56) References Cited

U.S. PATENT DOCUMENTS

| | | | | |
|---|---|---|---|---|
| 5,485,618 | A * | 1/1996 | Smith | 715/710 |
| 5,798,757 | A * | 8/1998 | Smith | 715/709 |
| 6,671,691 | B1 * | 12/2003 | Bigus | 1/1 |
| 7,103,835 | B1 * | 9/2006 | Yankovich et al. | 715/234 |
| 7,725,483 | B2 * | 5/2010 | Poyourow et al. | 707/763 |
| 7,734,625 | B2 * | 6/2010 | Weinberg et al. | 707/736 |
| 7,836,427 | B1 * | 11/2010 | Li et al. | 717/117 |
| 7,870,162 | B2 * | 1/2011 | Weinberg et al. | 707/802 |
| 2004/0153995 | A1 * | 8/2004 | Polonovski | 717/113 |
| 2005/0091420 | A1 * | 4/2005 | Snover et al. | 710/1 |
| 2006/0294158 | A1 * | 12/2006 | Tsyganskiy et al. | 707/202 |
| 2007/0027858 | A1 * | 2/2007 | Weinberg et al. | 707/4 |
| 2007/0078823 | A1 * | 4/2007 | Ravindran et al. | 707/3 |
| 2007/0135949 | A1 * | 6/2007 | Snover et al. | 700/86 |
| 2009/0113384 | A1 * | 4/2009 | Kosov et al. | 717/105 |
| 2011/0138335 | A1 * | 6/2011 | Zacariah et al. | 715/843 |

OTHER PUBLICATIONS

Fitzgerald et al., Special Edition Using Crystal Reports 10, Jul. 14, 2004, Que, Chapter 4, Using the Workshop Formula Editor, ISBN 978-0-7897-3113-5.*
Liberty, Programming Visual Basic 2005, Sep. 16, 2005, O'Reilly Media, Inc., Chapter 15 section 3, ISBN 978-0-596-00949-6.*
SQL Prompt, Jun. 17, 2007, http://web.archive.org/web/20070617021500/http://www.red-gate.com/products/SQL_Prompt/index.htm.*
Bagui et al., Learning SQL on SQL Server 2005, Apr. 26, 2006, O'Reilly Media, Inc., p. 20, ISBN 978-0-596-10215-9.*
Baiter, Microsoft Office Access 2003 in a Snap, Aug. 9, 2004, Sams, p. 174, ISBN 978-0-672-32544-6.*
Microsoft Office Action Online, "Using the Expression Builder" printed on Oct. 1, 2009 from website http://office.microsoft.com/en-us/access/HP051866381033 ; pp. 1-5.

(Continued)

*Primary Examiner* — Frantz Coby
(74) *Attorney, Agent, or Firm* — Weaver Austin Villeneuve & Sampson LLP (57) ABSTRACT

In accordance with one aspect of the invention, methods and apparatus for providing information for use in generating or modifying an expression are disclosed. Input from a user is received within an expression. A list of one or more suggestions is provided in response to the input. A selection of one of the suggestions in the list is received. The expression is then built to include the selection.

31 Claims, 8 Drawing Sheets

OTHER PUBLICATIONS

Expression Web 2 Beta, "Expression Web Blog" printed on Oct. 1, 2009 from website http://www.expression-web.net/expression-web-2-beta/ pp. 1-4.

Google Docs Tour, Create documents, spreadsheets and presentations online printed on Oct. 1, 2009 from website http://www.google.com/google-d-s/intl/en/tour1.html 1 pg.

* cited by examiner

EXPRESSION BUILDER

RELATED APPLICATIONS

This application claims priority from Provisional Application No. 60/937,578, entitled "EXPRESSION BUILDER," filed on Jun. 27, 2007, by He et al, which is incorporated herein for all purposes in its entirety.

BACKGROUND OF THE INVENTION

An expression may be defined as a symbol or combination of symbols that represents a quantity or a relationship between quantities. Thus, an expression can be used to generate a numerical value. However, an expression need not be a mathematical expression. For instance, an expression may be a symbol or combination of symbols that represents any value or relationship between values. In other words, the values need not be numerical.

Typically, a user completing an expression via a software application must enter each symbol, quantity, or value. As a result, the user must be aware of the symbols, quantities, or values that can be included in the expression. Depending upon the context in which the expression is used, the user may be required to have access to or remember a large number of symbols, quantities, or values that are permitted within the context in which the expression is used. This is even more problematic when the user has never used the application, or rarely uses the application.

In view of the above, it would be desirable to implement a more user-friendly manner of generating an expression.

SUMMARY OF THE INVENTION

In accordance with one aspect of the invention, methods and apparatus for providing information for use in constructing an expression are disclosed. This is accomplished using a software application that enables a user to generate or modify an expression within the context of the expression. The software application may be any web-based application that enables a user to enter an expression.

For instance, an expression may be constructed in order to generate or modify a report. Input from a user is received within an expression. A list of one or more suggestions is provided in response to the input. A selection of one of the suggestions in the list is received. The expression is then built to include the selection.

In accordance with another aspect of the invention, the list of suggestions includes one or more functions or operators. By selecting a function or operator, the user may be presented with a list of suggestions as to the parameters or types of parameters that can be selected or entered. For instance, the user may be presented with a list of data fields that can be selected.

In accordance with yet another aspect of the invention, the list of suggestions is pertinent to the context in which the suggestions are provided. For instance, a user may wish to add a column to a report. When the user enters an expression in association with the added column, a list of data fields that can be used in constructing an expression (e.g., those data fields that are already present in the report) may be presented for selection by the user. In this manner, the suggestions that are provided to the user may be limited to those that are pertinent to the data in the report.

In accordance with another aspect of the invention, the invention pertains to a system operable to perform and/or initiate any of the disclosed methods. The system includes one or more processors and one or more memories. At least one of the memories and processors are adapted to provide at least some of the above-described method operations. In yet a further embodiment, the invention pertains to a computer program product for performing the disclosed methods. The computer program product has at least one computer readable medium and computer program instructions stored within at least one of the computer readable product configured to perform at least some of the above described method operations. In still a further embodiment, the invention pertains to data structures used to perform the disclosed methods.

These and other features of the present invention will be presented in more detail in the following detailed description of the invention and the associated figures.

DESCRIPTION OF EMBODIMENTS OF THE INVENTION

In the following description, numerous specific details are set forth in order to provide a thorough understanding of the disclosed embodiments. It will be obvious, however, to one skilled in the art, that the disclosed embodiments may be practiced without some or all of these specific details. In other instances, well known process steps have not been described in detail in order not to unnecessarily obscure the disclosed embodiments.

The disclosed embodiments enable an expression to be built in an efficient manner. In one embodiment, an expression builder provides a list of one or more suggestions to enable the user to complete the expression. For instance, the suggestions that are provided can include functions, operators (e.g., AND, OR, NOT), parameters (or parameter types), and/or data items (or data types) that are possible within the context in which the expression is used.

In one embodiment, an expression builder is used to build an expression within the context of a report via an application such as a web-based application. For instance, an expression can be used in association with a column of the report (e.g., to add a column to the report). The suggestions that are provided can therefore include data fields that can be used to construct an expression (e.g., data fields in the report). The list of suggestions can also be dependent upon other items in the expression. For instance, the type of data fields that are presented may be dependent upon the parameter types of a function or operator that has been selected. In this manner, suggestions are provided within the context of the report in which the expression is being generated.

Figure 1:
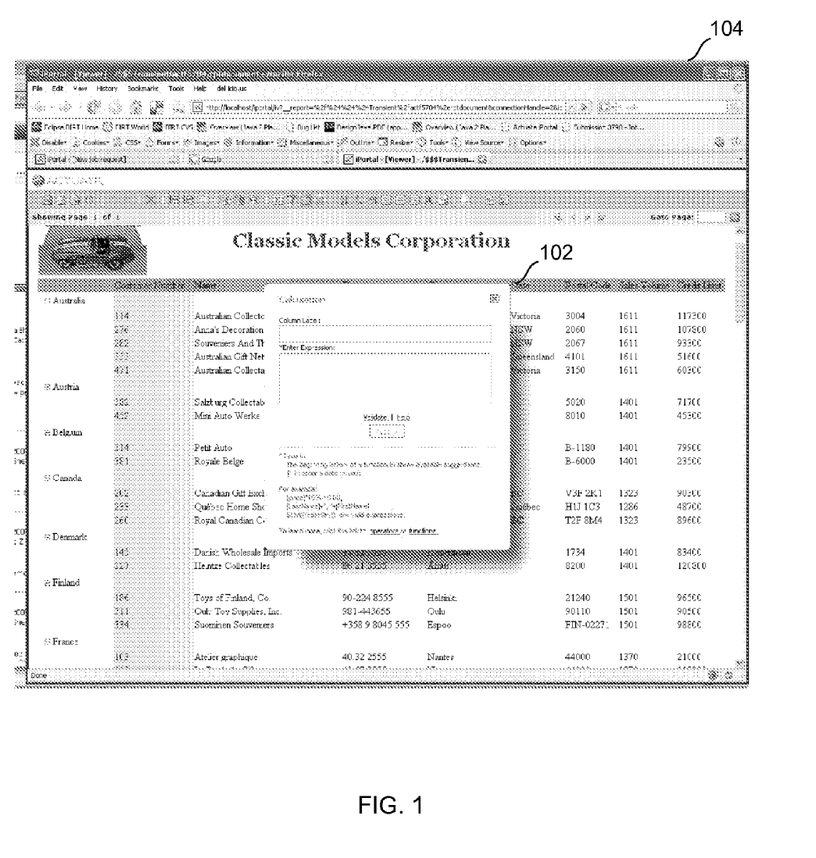
FIG. 1 is an example of a screen shot of an expression builder that can be used to modify or generate a report.

FIG. 1 is an example of a screen shot of an expression builder 102 that can be used to modify or generate a report. In this example, the expression builder 102 is represented by a dialog box that is presented during the generation of a report 104. The user may, for example, initiate the expression builder 102 to add a new column to the report 104.

Figure 2:
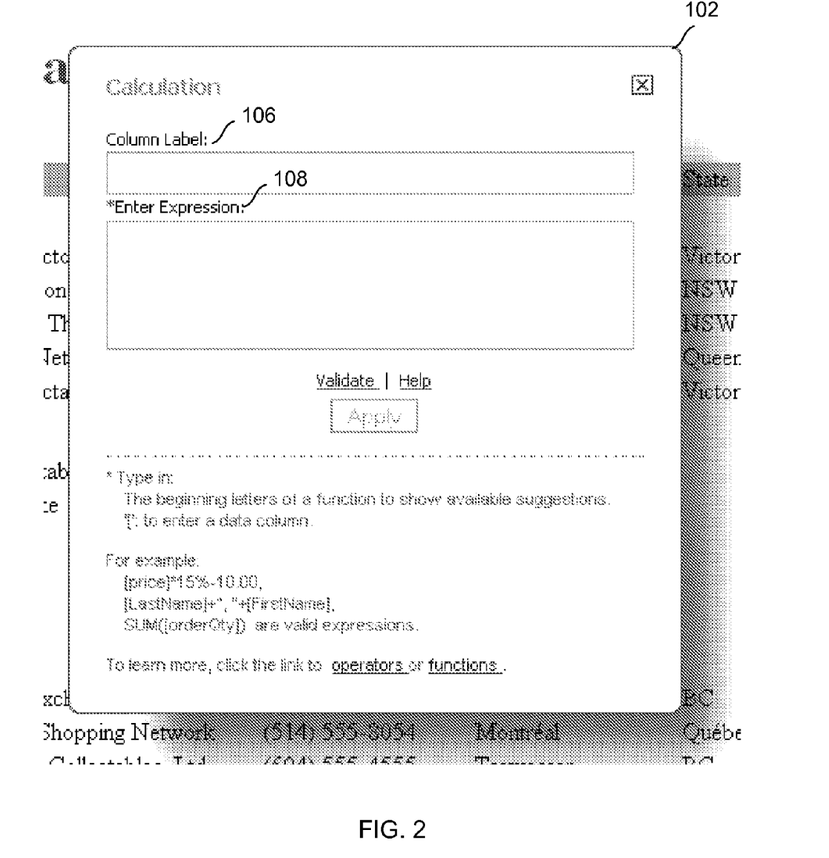
FIG. 2 is an example of a graphical user interface that can be used to add a column to a report.

FIG. 2 is an example of a graphical user interface that can be used to add a column to a report. The expression builder 102 can be accessed by submitting information in two different input fields, where the first input field enables the user to identify a column via a column label 106 and the second input field enables the user to enter an expression as shown at 108. Once completed, the expression can be used to generate a value in each field of the column 106.

In order to use the expression builder, the user may type in one or more letters in the input field 108. By typing in one or more beginning letters, the expression builder 102 can provide a list of one or more suggestions. For instance, the suggestions can include one or more functions or operators. The use of a symbol such as "[" can be used to designate a data column, such as [price], [LastName], [FirstName], or [Order-Qty]. In other words, the use of the symbol "[" can indicate a request for suggestions for data fields.

Once an expression has been completed, a Validate option 110 can be selected to validate the expression. Validation may include determining whether the expression is syntactically correct. If the expression is not valid, an error message may be displayed. Alternatively, if the expression is valid, an appropriate message may be displayed.

In order to execute the expression, the user may select an Apply option 112. By executing the expression, a single value can be generated in the column designated by the column 106. In this manner, an expression may be generated or modified.

Figure 3:
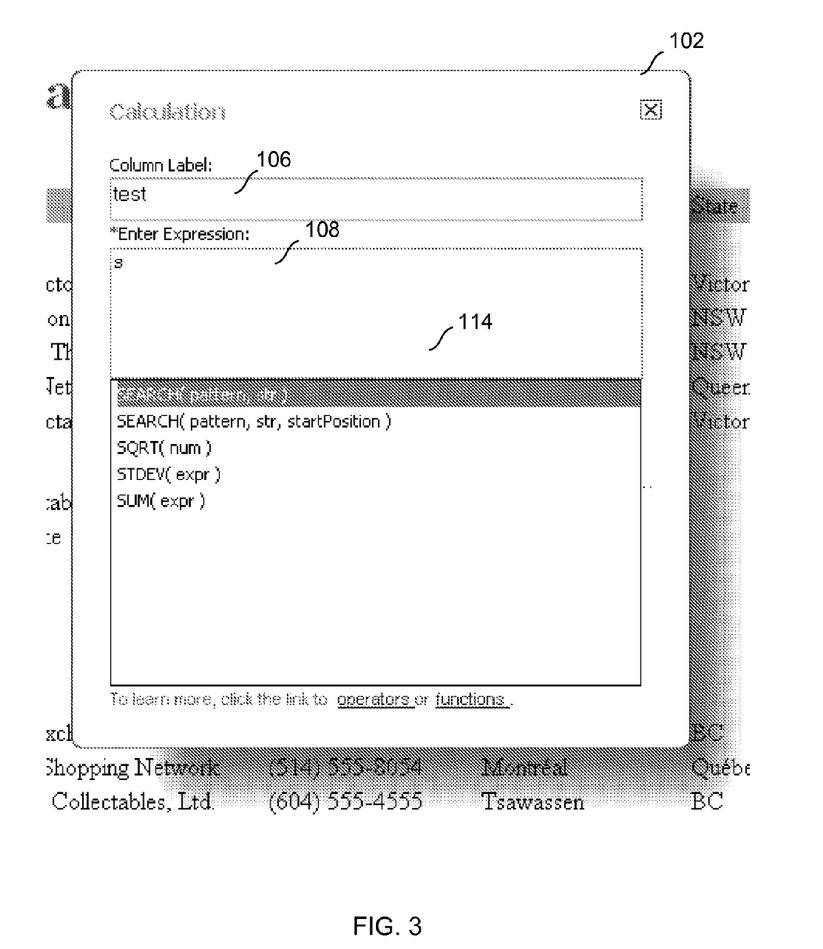
FIG. 3 is an example of a list of suggestions that can be presented in response to user input.

FIG. 3 is an example of a list of suggestions that can be presented in response to user input. In this example, the user types in "s" into the input field 108. In response, a list of suggestions is provided at 114. In this example, the list of suggestions includes a list of functions starting with the letter "s" that has been entered by the user. The user can then select one of the functions (or operators) from the list. This can be accomplished, for example, by using the mouse, the up/down key, or the enter key.

In this example, the list of suggestions is provided external to the expression. However, the list of suggestions can also be provided internal to the expression. Moreover, the list of suggestions can be provided in another format, such as a menu or drop-down menu.

Figure 4:
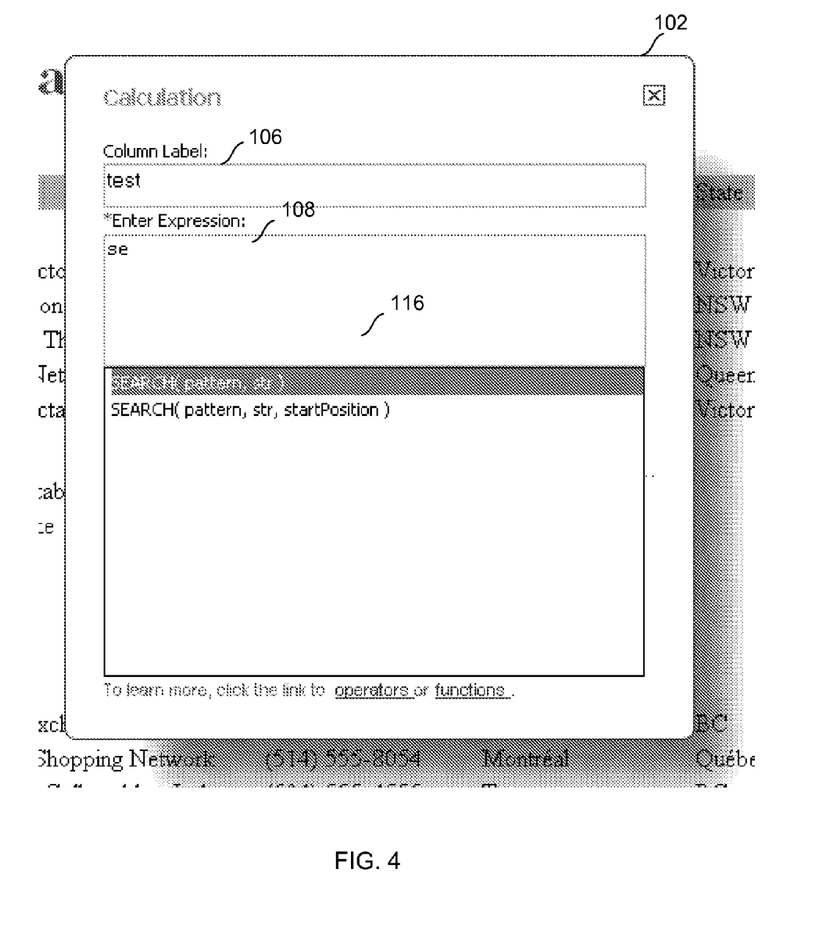
FIG. 4 is an example of a list of suggestions that can be presented in response to additional user input.

FIG. 4 is an example of a list of suggestions that can be presented in response to additional user input. As shown in this example, the user enters "se" into the input field 108. In response, a list of suggestions starting with "se" is provided at 116. More particularly, in this example, a list of functions is provided at 116. In this example, the list of functions includes "SEARCH(pattern, str)" and "SEARCH(pattern, str, startPosition)." Thus, the function "SEARCH" may operate on one or more parameters and/or data items. More particularly, the function may specify the parameter(s), data item(s), and/or data type(s) that are to be entered or selected by the user.

Figure 5:
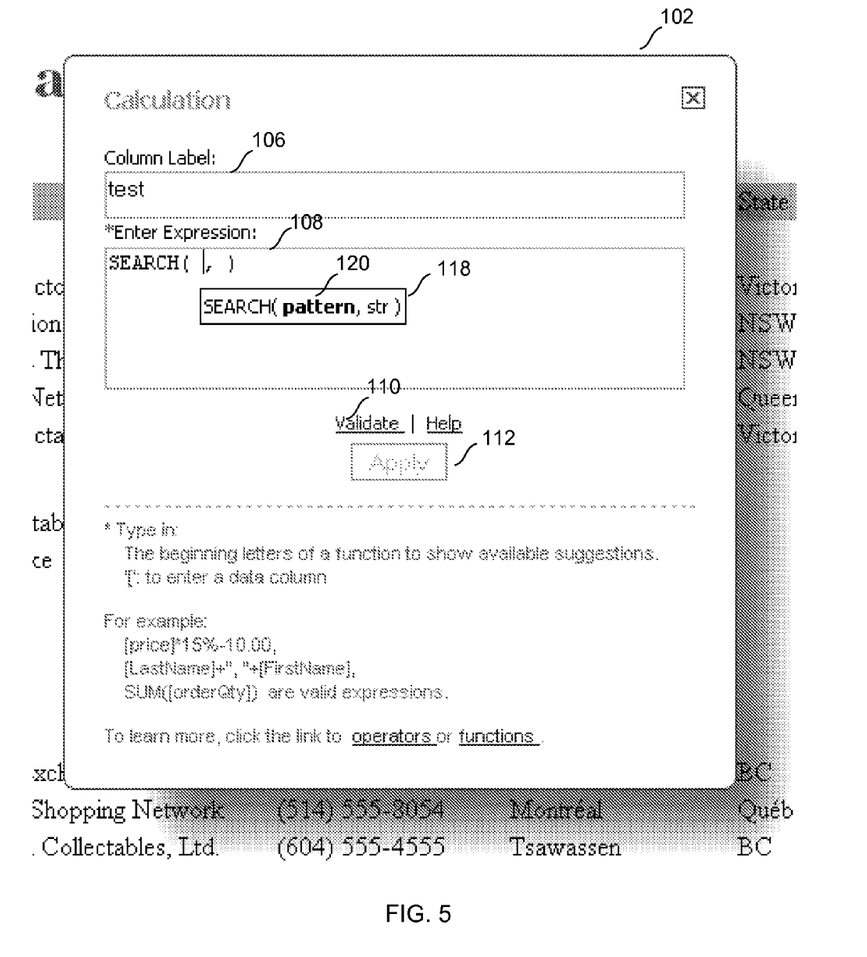
FIG. 5 is an example of a list of suggested parameters that can be presented in response to the selection of a function.

FIG. 5 is an example of a list of suggested parameters that can be presented in response to the selection of a function. In this example, the user selects the "search(,)" function, which can then be shown in the input field 108. The expression builder may then provide a list of one or more parameters, parameter types, data items, and/or data types that can be selected or entered by the user. In this example, by placing the cursor inside the function, the user may request that suggestions be provided. Alternatively, the user may request that suggestions be provided in another manner. In this example, a suggestion box 118 showing the parameters (e.g., parameter types or data types) that the function takes can be provided, shown as "SEARCH(pattern, str). In this manner, a list of suggestions indicates the parameter(s) or parameter type(s) that can be selected or entered by the user for inclusion in the expression. Moreover, the parameter at the current cursor position may be highlighted (e.g., bold), as shown at 120. In this manner, the suggestions that are provided are associated with the function that was previously selected.

Figure 6:
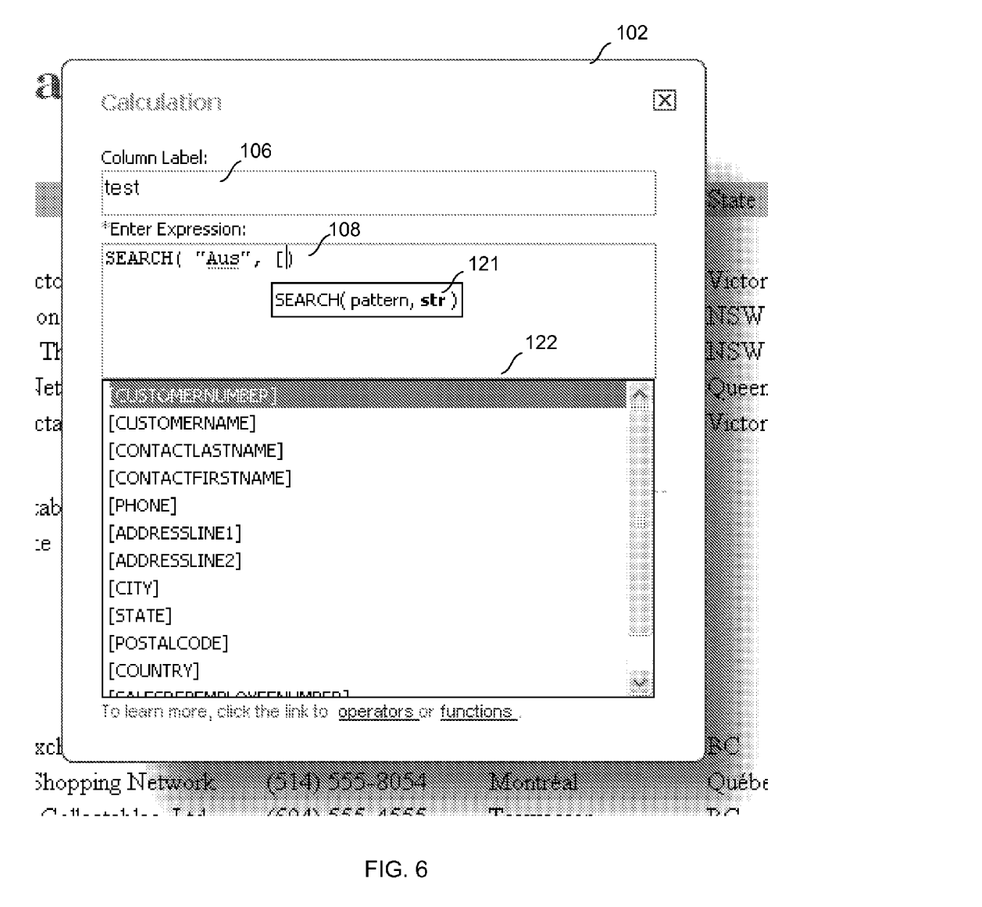
FIG. 6 is an example of a list of available data fields that can be presented as possible selections as a parameter.

FIG. 6 is an example of a list of available data fields that can be presented as possible selections as a parameter. In this example, the user places the cursor at the location of the parameter for which a list of available data fields is requested. More particularly, as shown, the user places the cursor at the location of the second parameter of the function, as shown at 108. Again, the parameter at the current cursor position may be highlighted (e.g., bold), as shown at 121. In one embodiment, by typing a symbol such as "[" at the location of the cursor, a list of one or more available data items can be presented. More particularly, as shown at 122, a list of one or more data fields that are available for selection is presented. The user can continue to type one or more letters to reduce the list size, or the user can select a data field from the list. In one embodiment, the data fields are those that can be used to construct an expression (e.g., data fields that are pertinent to the report). In other words, the data fields are those that are already present in the report. In this manner, a list of available data items or data types that may be entered or selected in association with a particular parameter of a function or operator can be presented.

Figure 7:
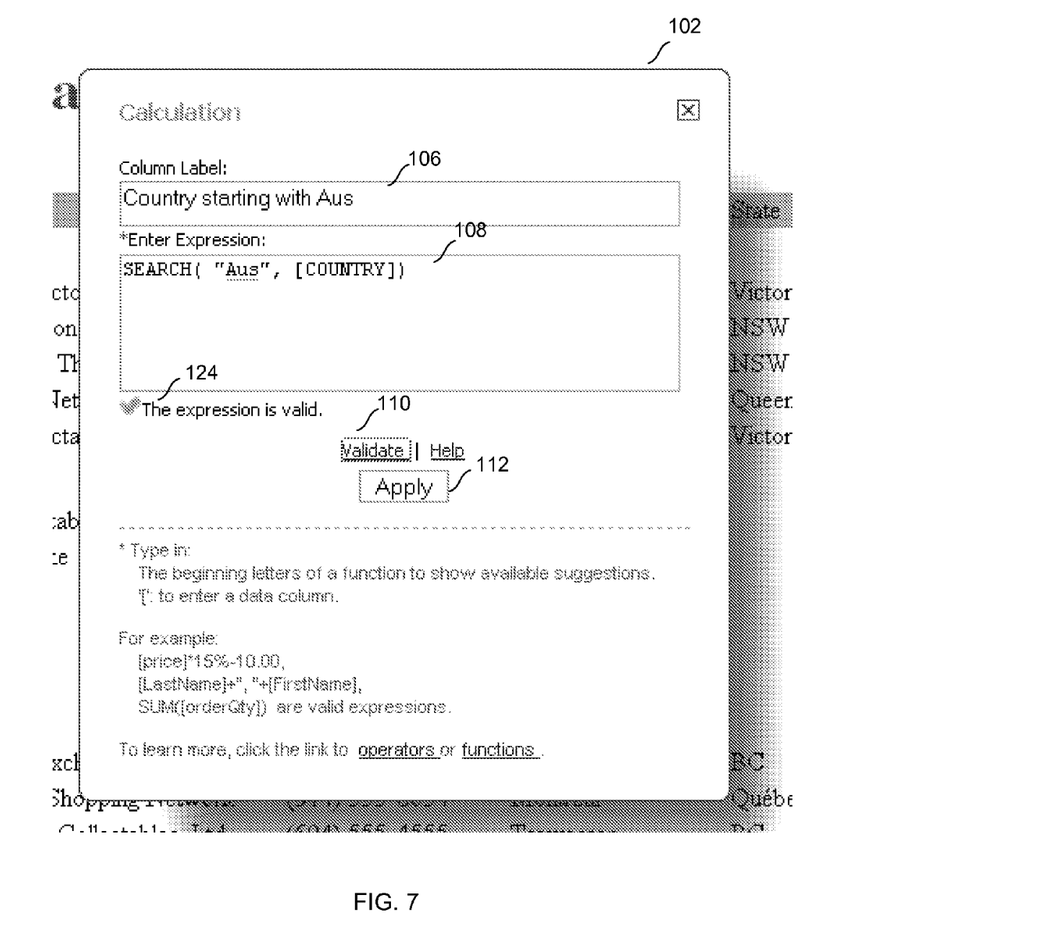
FIG. 7 is an example of a validate option that can be used to validate an expression.

Once the user has identified a column (e.g., by entering a column label) at 106 and entered an expression at 108, the user can validate the expression. FIG. 7 is an example of a validate option that can be used to validate an expression. More particularly, the user can select the Validate option 110. For instance, validation may include checking that the number of parameters present and/or the data types of the parameters are correct with respect to the selected function (or operator). Since the parameters of the function are valid in this example, the expression is valid. Validation can also include checking that the data types of any other data items in the expression are valid. A message indicating that the expression is valid can then be presented at 124.

Figure 8:
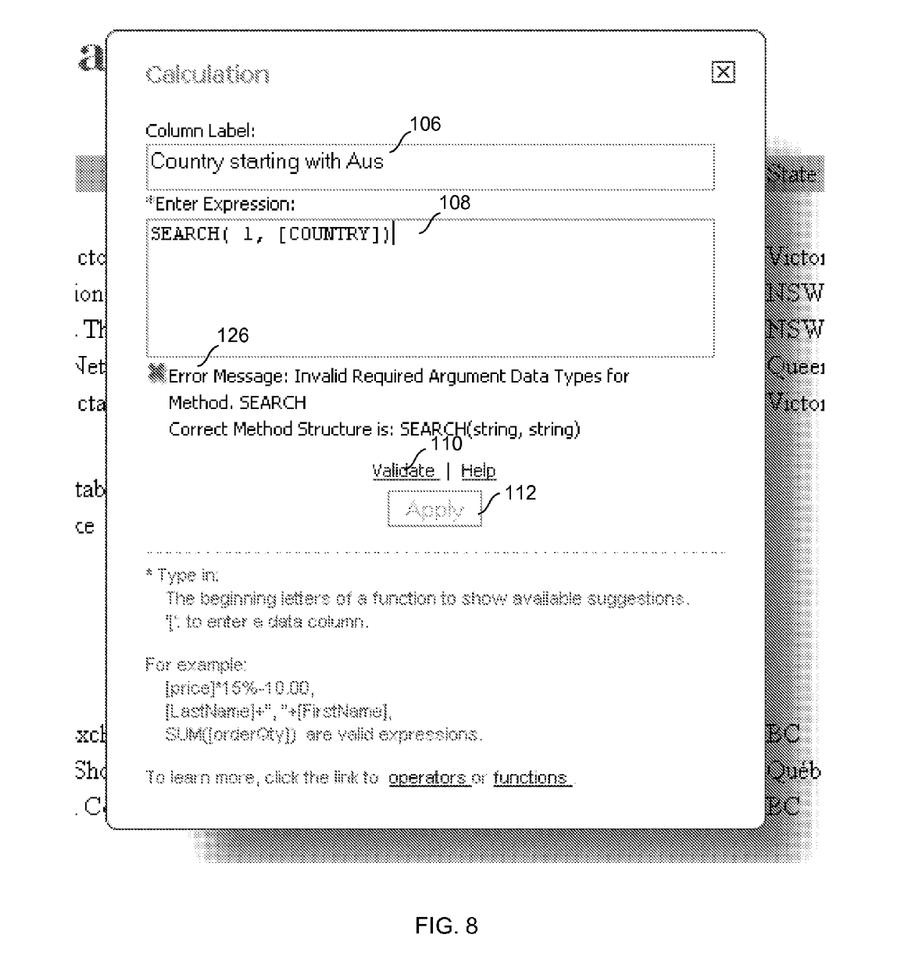
FIG. 8 is an example of an error message that can be presented when the expression is not valid.

In FIG. 8, the user changes the first parameter of the function shown at 108 from "Aus" to the number "1." Therefore, the first parameter is no longer a string as required by the SEARCH function. As a result, an appropriate error message may be presented. An example of an error message that can be presented when the expression is not valid is shown at 126. More particularly, in this example, the error message indicates that the argument data types for the method (i.e., function) are invalid, and indicates the correct structure of the method (i.e., function).

Assuming that the expression is valid, the user can add the expression to a report by selecting the Apply option 112. The expression can be used to generate a numerical value. Alternatively, the expression can be used to generate a value that need not be numerical. For instance, the expression can generate a string value or other data type.

The report that is generated may be any type of report. For instance, the report may be a spreadsheet report, simple listing report, tabular report, grouped listing report, a crosstab report, etc.

The functions, operators, and possible parameters and parameter types associated with the functions/operators may be stored in one or more data structures accessible to the expression builder. For instance, the data structures may include one or more files, databases such as relational databases, etc.

The manipulations performed are often referred to in terms, such as storing, providing, or generating. In any of the operations described herein that form part of the embodiments of the invention, these operations are machine operations. Useful machines for performing the operations of the present invention include general-purpose digital computers, networks of such computers, or other programmable systems. In all cases, there is a distinction between the method of operations in operating a computer and the method of computation itself. The disclosed embodiments relate to method steps for operating a computer in processing electrical or other physical signals to generate other desired physical signals.

The embodiments of the invention also relate to an apparatus for performing these operations. This apparatus may be specially constructed for the required purposes, or it may be a general purpose computer or network of computers selectively activated or reconfigured by a computer program stored on a machine readable medium. The processes presented herein are not inherently related to any particular computer or other apparatus. In particular, various general-purpose machines may be used with programs written in accordance with the teachings herein, or it may be more convenient to construct a more specialized apparatus to perform the required method steps. The required structure for a variety of these machines will appear from the description given below.

Still further, the present invention relates to machine-readable media on which are stored program instructions for performing operations on a computer. Such media includes by way of example magnetic disks, magnetic tape, optically readable media such as CD ROMs, semiconductor memory such as PCMCIA cards, etc. In each case, the medium may take the form of a portable item such as a small disk, diskette, cassette, etc., or it may take the form of a relatively larger or immobile item such as a hard disk drive or RAM provided in a computer.

A computer system may include a server and one or more clients. In various embodiments, software providing the disclosed functionality is provided on the server and can be accessed through the various clients. The server and/or clients in accordance with the disclosed embodiments may include a central processing unit (CPU), input/output (I/O) circuitry, and memory—which may be read only memory (ROM) and/or random access memory (RAM). The server and/or clients may also optionally include a display, a mass storage unit, a keyboard, and a clock.

In one embodiment, the CPU is one or more microprocessor chips selected from complex instruction set computer (CISC) microprocessors, reduced instruction set computer (RISC) microprocessors, or other available microprocessors. The CPU may be coupled to a memory by a bi-directional data bus, but may also be coupled by a unidirectional data bus in the case of ROM. The memory may also be coupled to the CPU by appropriate control and address busses, as is well known to those skilled in the art.

The CPU may be coupled to the I/O circuitry by a bi-directional data bus to permit data transfers with peripheral devices. I/O circuitry may include a number of latches, registers and direct memory access (DMA) controllers. The purpose of the I/O circuitry is to provide an interface between CPU and such peripheral devices as display assembly, mass storage (e.g., disks), keyboard, and clients/server(s). The display assembly of a server or client may receive data from the I/O circuitry via the bus and displays that data on a suitable screen. Mass storage can be coupled to I/O circuitry by a bi-directional data bus. Generally, mass storage will be a hard disk drive, a tape drive, or some other long-term storage device. It may be used to store data structures, possible functions or operators, data fields, programs for accessing or generating expressions or reports, etc.

The keyboard may communicate with the CPU via data bus and I/O circuitry. In addition to a keyboard, other types of input devices can also be used in conjunction with the disclosed embodiments. For example, a computer mouse, a track ball, a track pad, or a pen-based tablet can be used to manipulate a pointer on a display screen. A clock may comprise a real-time clock to provide real-time information to the system. Alternatively, the clock can simply provide regular pulses to, for example, an interrupt port of the CPU, which can count the pulses to provide the time function. The clock may be coupled to the CPU by a data bus.

The clients may include terminals, personal computers, workstations, minicomputers, and mainframes. For purposes of the disclosed embodiments of the invention, any data processing devices that can access the expression builder on server are clients. It should be understood that the clients may be manufactured by different vendors and may also run different operating systems such as MS-DOS, Microsoft Windows, Microsoft NT, various forms of UNIX, OS/2, MAC OS and others. Clients are connected to I/O circuitry via bi-directional lines. Bidirectional lines may be any suitable media such as coaxial cable, twisted pair wiring, fiber optic line, radio channels, and the like. Further, the network resulting from the interconnection of the lines may assume a variety of topologies, including ring, bus, star, and may include a collection of smaller networks linked by gateways and bridges. As with the clients, it should be understood that the server may run different operating systems such as MS-DOS, Microsoft Windows, Microsoft NT, UNIX, VMS, OS/2, MAC OS and others. The clients need not use the same operating system as the server.

It is also within the scope of the embodiments of the invention to implement the apparatus and methods described herein on a "stand-alone" computer, which does not form part of a network.

Although the foregoing embodiments have been described in some detail for purposes of clarity of understanding, it will be apparent that certain changes and modifications may be practiced within the scope of the appended claims. For instance, although the specification has described specific examples of an expression builder, other types of user interfaces may be used. Moreover, the expression builder may be used to generate an expression for purposes other than those stated.

What is claimed is:

1. A computer-implemented method, comprising:
receiving by a processor input from a user within a context of an expression;
providing a list of one or more suggestions in response to the input, wherein the list of one or more suggestions indicates one or more operators that can be selected for inclusion in the expression;
receiving a selection of one of the suggestions in the list;
providing a second list of one or more suggestions in response to a selection of one of the operators, wherein the second list of suggestions is based, at least in part, on the selected operator,
wherein the second list of one or more suggestions indicates one or more parameters that can be selected or entered for inclusion in the expression;

wherein the one or more parameters include one or more data items corresponding to one or more data fields of a database; and building the expression to include the selection such that the expression is constructed or modified.

2. The method as recited in claim 1, wherein the expression is associated with a column in a report.

3. The method as recited in claim 2, wherein the data fields include only data fields that are pertinent to the report.

4. The method as recited in claim 1, further comprising:
adding a column to the report such that the expression is associated with a column label of the column.

5. The method as recited in claim 4, further comprising:
executing the expression to generate a value in the column, wherein the data fields include only data fields that are present in the report.

6. The computer-implemented method as recited in claim 1, wherein providing a list of one or more suggestions in response to the input comprises:
providing a menu including the list of one or more suggestions.

7. The computer-implemented method as recited in claim 1, wherein providing a list of one or more suggestions in response to the input comprises:
providing a list of one or more suggestions within the expression.

8. The computer-implemented method-as recited in claim 1, wherein providing a list of one or more suggestions in response to the input comprises:
providing a list of one or more suggestions external to the expression.

9. The method as recited in claim 1, wherein receiving input from a user within a context of an expression comprises:
receiving one or more characters in an input field in which the expression is typed.

10. The method as recited in claim 9, wherein the input field is a field of the report.

11. An apparatus comprising:
a processor; and
a memory, at least one of the processor or the memory being adapted for:
receiving input from a user within a context of an expression;
providing a list of one or more suggestions in response to the input, wherein the list of one or more suggestions indicates one or more parameters that can be selected or entered for inclusion in the expression as parameters of the expression, wherein the list of one or more suggestions identifies one or more data items that can be selected for inclusion in the expression, the data items corresponding to one or more data fields of a database;
receiving a selection of one of the suggestions in the list; and
building the expression to include the selection such that the expression is constructed or modified.

12. The apparatus as recited in claim 11, wherein the data fields consist of data fields implemented in a report.

13. A computer-implemented method, comprising:
receiving by a processor input from a user within a context of an expression;
providing a list of one or more suggestions in response to the input, wherein the list of one or more suggestions indicates one or more data items that can be selected for inclusion in the expression, wherein the data items include one or more data fields of a database;
receiving a selection of one of the suggestions in the list; and building the expression to include the selection such that the expression is constructed or modified.

14. The computer-implemented method as recited in claim 13, wherein the data fields consist of data fields that are already present in a report.

15. The computer-implemented method as recited in claim 14, further comprising:
executing the expression to generate the report.

16. A computer-implemented method, comprising:
receiving by a processor input from a user within a context of an expression, wherein receiving input from a user within a context of the expression comprises receiving one or more characters in an input field in which the expression is typed;
providing a list of one or more suggestions in response to the input;
receiving a selection of one of the suggestions in the list;
building the expression to include the selection such that the expression is constructed or modified; and
adding the expression to a report, wherein the list of one or more suggestions is dependent upon a data context of the report.

17. The computer-implemented method as recited in claim 16, further comprising:
executing the expression to modify the report.

18. The computer-implemented method as recited in claim 16, wherein the report is a spreadsheet report.

19. A computer-implemented method comprising:
receiving by a processor input from a user within a context of an expression, wherein receiving input from a user within a context of the expression comprises receiving one or more characters in an input field in which the expression is typed;
providing a list of one or more suggestions in response to the input, wherein the list of one or more suggestions indicates one or more data items that can be selected for inclusion in the expression;
receiving a selection of one of the suggestions in the list; and
building the expression to include the selection such that the expression is constructed or modified;
wherein the list of one or more suggestions is dependent upon a data context of a report.

20. The method as recited in claim 19, wherein the data items include one or more data fields, wherein the input comprises a predefined symbol that indicates a request for suggestions for data fields.

21. The method as recited in claim 20, wherein the list of suggestions comprises data fields that are pertinent to the report.

22. The method as recited in claim 20, wherein the list of suggestions consists of data fields that are implemented in the report.

23. An apparatus, comprising:
a processor; and
a memory, at least one of the processor or the memory being adapted for:
receiving input from a user within a context of the expression, wherein receiving input from a user within a context of the expression comprises receiving one or more characters in an input field in which the expression is typed;
providing a list of one or more suggestions in response to the input, wherein the list of one or more suggestions indicates one or more data items that can be selected or entered with respect to the other items in the expression;

receiving a selection of one of the suggestions in the list; and building the expression to include the selection such that the expression is constructed or modified wherein the list of one or more suggestions is dependent upon a data context of the expression, and wherein the list of one or more suggestions or other items within the expression include one or more operators.

24. The apparatus as recited in claim 23, at least one of the processor or the memory being adapted for perform steps further comprising:

automatically validating the expression.

25. The apparatus as recited in claim 24 wherein validating is performed in response to a user selection of a validate option.

26. The apparatus as recited in claim 24, wherein validating the expression comprises checking that one or more data items or parameters of the expression are of the correct data type.

27. An apparatus, comprising:

a processor; and a memory, at least one of the processor or the memory being adapted for:

receiving input from a user within a context of an expression;

automatically providing a list of one or more suggestions in response to the input, wherein the list of one or more suggestions identifies one or more data items that can be selected or entered within the expression, the data items representing data fields of a database;

receiving a selection of one of the suggestions in the list; and building the expression to include the selection such that the expression is constructed or modified;

wherein the list of one or more suggestions is dependent upon other items within the expression, and wherein the other items within the expression include one or more operators.

28. A non-transitory computer-readable medium storing thereon computer-readable instructions, comprising:

instructions for receiving input from a user within a context of an expression;

instructions for providing a list of one or more suggestions in response to the input, wherein the list of one or more suggestions indicates one or more operators that can be selected for inclusion in the expression;

instructions for receiving a selection of one of the suggestions in the list; and instructions for providing a second list of one or more suggestions in response to a selection of one of the operators;

wherein the second list of one or more suggestions identifies one or more data items that can be selected or entered for inclusion in the expression.

29. An apparatus, comprising:

means for receiving input from a user within an expression;

means for providing a list of one or more suggestions by a processor in response to the input, wherein the list of one or more suggestions indicates one or more operators that can be selected for inclusion in the expression;

means for receiving a selection of one of the suggestions in the list;

means for constructing or modifying the expression such that the expression that is presented includes the selection; and means for providing a second list of one or more suggestions in response to a selection of one of the operators, wherein the second list of suggestions is based, at least in part, on the selected operator, wherein the second list of one or more suggestions indicates data items that can be selected or entered with respect to the other items in the expression.

30. An apparatus, comprising:

a processor; and a memory, at least one of the processor or the memory being adapted for:

receiving input from a user within an expression;

providing a list of one or more suggestions in response to the input, wherein the list of one or more suggestions indicates one or more operators that can be selected or entered for inclusion in the expression;

receiving a selection of one of the suggestions in the list;

building the expression to include the selection such that the expression is generated or modified; and providing a second list of one or more suggestions in response to a selection of one of the operators, wherein the second list of suggestions is based, at least in part, on the selected operator, wherein the second list of one or more suggestions indicates one or more data items that can be selected or entered with respect to the other items in the expression, wherein the data items correspond to data fields of a database.

31. A computer-readable medium storing thereon computer-readable instructions, comprising:

instructions for receiving input from a user within an expression, wherein receiving input from a user within a context of the expression comprises receiving one or more characters in an input field in which the expression is typed;

instructions for automatically providing a list of one or more suggestions in response to the input, wherein the list of one or more suggestions is dependent upon other items within the expression, and wherein the list of one or more suggestions or the other items within the expression include one or more operators;

instructions for receiving a selection of one of the suggestions in the list; and instructions for building the expression to include the selection such that the expression is generated or modified.

* * * * *